Figure 1:
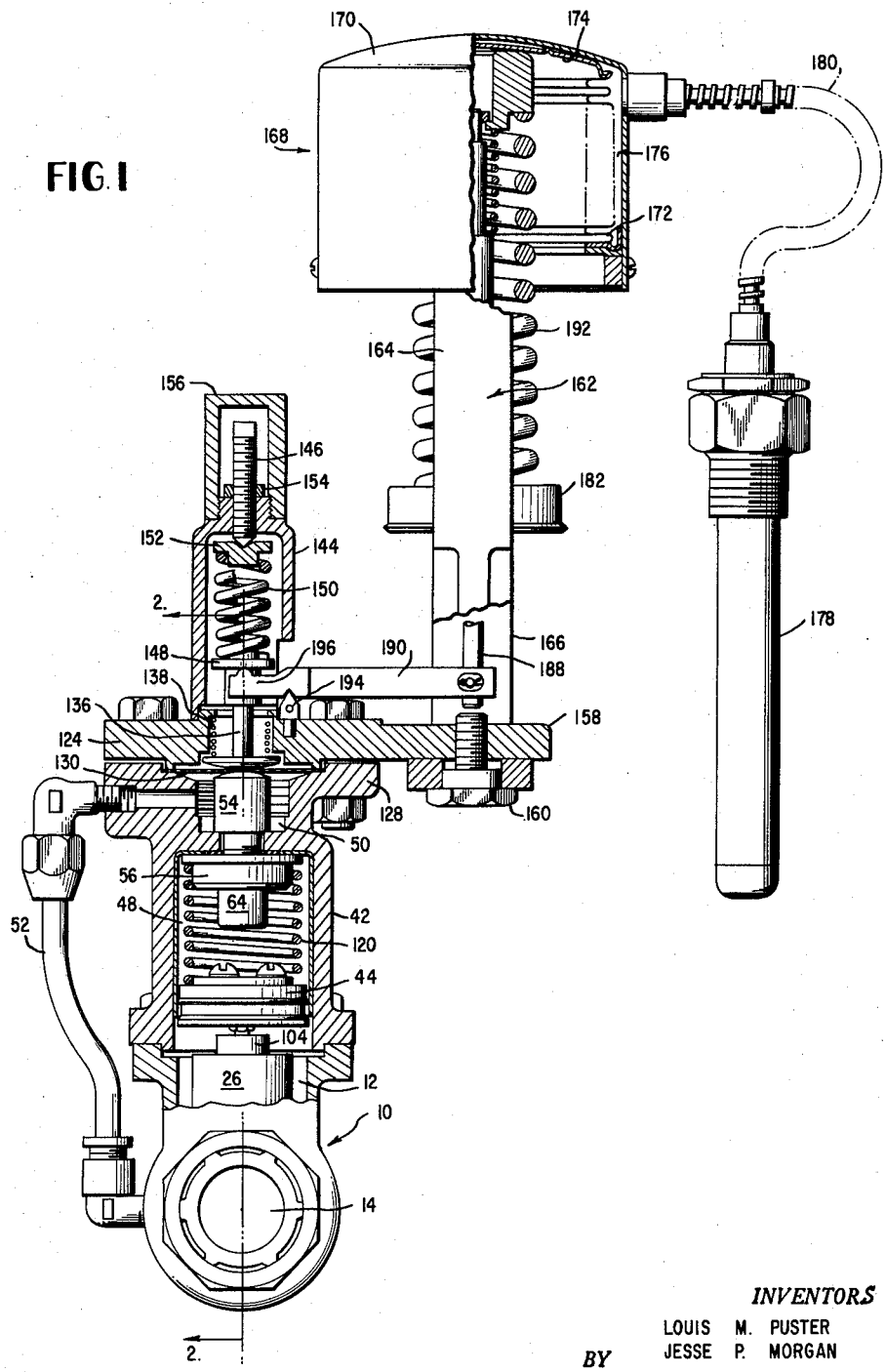

Nov. 3, 1964   L. M. PUSTER ETAL   3,155,317
COMBINATION TEMPERATURE AND PRESSURE REGULATOR
Filed March 26, 1962   2 Sheets-Sheet 1

INVENTORS
LOUIS M. PUSTER
JESSE P. MORGAN
BY
Mead, Browne, Schuyler & Beveridge
ATTORNEYS

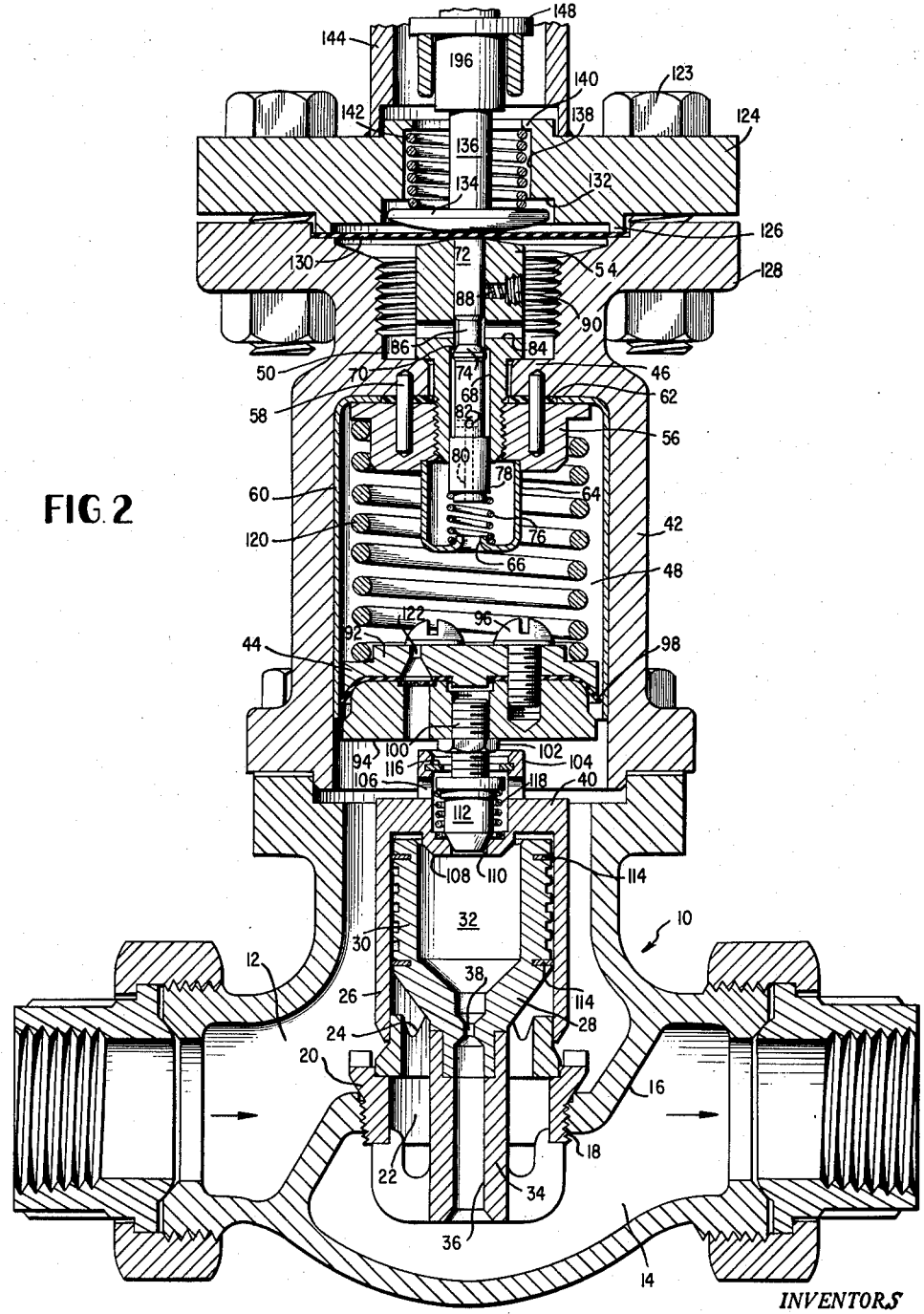

United States Patent Office 3,155,317
Patented Nov. 3, 1964

3,155,317
COMBINATION TEMPERATURE AND
PRESSURE REGULATOR
Louis M. Puster and Jesse P. Morgan, Knoxville, Tenn.,
assignors to Robertshaw Controls Company, Richmond,
Va., a corporation of Delaware
Filed Mar. 26, 1962, Ser. No. 182,422
8 Claims. (Cl. 236—80)

This invention relates to regulating valves for controlling temperature and pressure.

In heating, ventilating and air conditioning systems, and industrial processes requiring temperature control, temperature is frequently controlled by varying the position of a valve to adjust the rate of flow of steam or some other temperature controlling medium. The position of the valve may be determined by a diaphragm or piston responsive to the pressure drop across the valve, or which may be responsive to temperature variations. However, due to the pressure drop across the valve between the inlet and the outlet, the force required to open the valve must be sufficient to overcome the force of the inlet pressure tending to close the valve. This limits the accuracy of response to the valve, and the operating piston or diaphragm is required to have a large effective area in order to provide a force sufficient to open the valve.

In certain applications such as steam heating systems, condensation of the steam causes the outlet pressure to drop resulting in an increase in flow through the valve which in turn increases the temperature at the heating appliance. Accordingly, it is desirable to control the rate of flow of the steam in accordance with temperature variations.

It is an object of this invention to provide an improved regulating valve in which the rate of flow through the valve is controlled in accordance with both temperature and pressure conditions.

Another object is to provide a piston-actuated regulating valve in which the dynamic force on the main valve due to flow are substantially eliminated requiring only a minimum amount of actuating force to change the position of the valve.

Another object is to provide an improved regulating valve in which the dynamic forces due to flow are eliminated prior to actuation of the valve in one direction but are utilized to augment the actuating force in the opposite direction.

Still another object is to provide an improved regulator for controlling temperature and pressure in which the maximum outlet pressure is controlled in accordance with temperature conditions.

In achievement of the foregoing and other objects, a regulating valve body is provided having an inlet and outlet chamber with a ported valve seat between the chambers. Mounted in the valve seat is a guide member having a cavity which opens at one end into the inlet chamber and is provided with a bleed port which communicates with the outlet chamber. Slidably mounted on the guide member is a main valve in the form of a sleeve which is provided with an end wall overlying the open end of the guide member and subject on one side to the inlet pressure and on the other side to the pressure in the cavity. Formed in the wall of the main valve is a port which connects the cavity with the inlet chamber. For actuating the valve, a piston forms a pressure responsive movable wall between the inlet chamber and a pilot chamber, and a spring in the pilot chamber biases the piston in a direction to close the main valve. Carried by the piston is an anticipating valve member which is moved by the piston in one direction to sequentially close the port in the main valve and move the valve toward the valve seat, and in the opposite direction to sequentially open the port and move the main valve away from the seat. Therefore, the opening force on the valve is determined solely by the pressure differential acting on the piston against the spring since the pressure in the cavity is substantially the same as that in the inlet chamber when the port is open.

Pressure in the pilot chamber is controlled by a pilot valve movably mounted in a port connecting the pilot chamber with the outlet chamber. Actuation of the pilot valve is accomplished by a pressure responsive diaphragm which is subject to the outlet pressure and moves the pilot valve away from the pilot port upon a decrease in the outlet pressure below a value determined by the force of a spring engaging one side of the diaphragm. For controlling the outlet pressure in accordance with temperature, a thermostatic element operates through a lever to decrease the opening force on the pilot valve as the temperature increases thereby decreasing the amount of pressure drop in the outlet chamber required to cause actuation of the pilot valve.

Other objects and advantages will become apparent from the following description taken in connection with the accompanying drawings in which:

FIG. 1 is a front view partially in section, of a regulating valve embodying the invention in its preferred form and FIG. 2 is an enlarged sectional view taken on line 2—2 of FIG. 1.

Referring first to FIG. 2, a valve body 10 is provided with an inlet chamber 12 and an outlet chamber 14 which are separated by a partition 16. Provided in partition 16 is an opening 18 into which is threadedly mounted a valve seat member 20 having a port 22 for connecting chambers 12 and 14. Valve seat member 20 is provided with a plurality of grooves or flutes 24 for cooperating with a main valve 26 to vary the rate of flow through port 22.

Mounted in the valve seat is a guide member 28 having a substantially cylindrical portion 30 which is provided with a cavity or recess 32 which is open at one end. Projecting downwardly from guide member 28 is a tubular stem 34 having a passage 36 formed therein. Cavity 32 has a restricted bleed port 38 at its lower end to provide communication between cavity 32 and outlet chamber 34 through passage 36.

Main valve 26 is substantially cylindrical in shape and is slidably received on guide member 28 for movement toward and away from valve seat 20 to vary the size of the openings provided by grooves 24 and thus the rate of flow through port 22. Valve 26 is provided with an end wall 40 which overlies the open end of cavity 32 and is thus subject on its upper side to the inlet pressure and on its lower side to the pressure in cavity 32.

Mounted on valve body 10 is a cylindrical casing member 42 in which is reciprocably mounted a piston 44. Piston 44 forms a pilot chamber 48 with the upper wall 46 of casing member 42 and pressure differentials between inlet chamber 12 and pilot chamber 48 causes reciprocal movement of the piston.

Formed in casing member 42 on the opposite side of pilot chamber 48 is a chamber 50 which communicates through a conduit 52 (FIG. 1) with outlet chamber 14. Seated in chamber 50 is a pilot valve seat member 54 having a threaded stem which extends through an opening in wall 46 and threadedly receives a spring seat member 56. Pins 58 received in cooperating openings in wall 46 and spring seat member 56 prevent member 56 from rotating relative to wall 46 and valve seat member 54.

Positioned in pilot chamber 48 is a smooth-walled cylindrical lining member 60 having an inwardly turned flange at its upper end which is clamped between members 56 and wall 46. A fluid tight seal is provided between spring seat member 56 and wall 46 by an annular, resilient gasket 62.

Secured to the lower wall of spring seat member 56 by soldering, welding or other conventional means, is a cup-shaped spring retainer 64 having a flanged opening 66 in its lower wall. Opening 66 is coaxially disposed with a passage 68 in valve seat member 54. Passage 68 is reduced in diameter to form a pilot valve seat 70. Reciprocably mounted in passage 68 is a stem 72 which is formed with a pilot valve member 74 for controlling flow through passage 68. Pilot valve 74 is biased toward engagement with valve seat 70 by a spring 76 mounted in retainer 64.

Formed on the lower end of stem 72 is an enlarged guide portion 78 which cooperates with the inner wall of the enlarged portion of passage 68 beneath valve seat 70. Vertical and transverse ports 80 and 82, respectively, are provided in the lower portion of stem 72 so that pilot chamber 48 is in pressure communication with passage 68 through opening 66 and ports 80 and 82.

When pilot valve 74 is moved away from valve seat 70, pilot chamber 48 communicates with chamber 50 through a transverse passage 84 in member 54 which intersects passage 68. Stem 72 is reduced in diameter at 86 in the area of passage 68 to permit fluid flow through the valve seat into chamber 50 when pilot valve 74 is open. Pilot valve seat member 54 is provided with a lateral opening for receiving a retaining spring 88 and a screw 90 for frictionally retaining stem 72 in passage 68.

Piston 44 comprises a pair of plate like members 92 and 94 which are joined together by screws 96. Disposed between members 92 and 94 is a resilient member 98, the peripheral edge of which cooperates with the wall of pilot chamber 48 to prevent fluid flow around the periphery of piston 44. Member 94 has a centrally disposed threaded opening for receiving a valve actuating stem 100 which is maintained in position by a locking nut 102.

Extending upwardly from end wall 40 of main valve 26 is a hollow projection 104 having transverse openings 106. Projection 104 is coaxial with a depending valve seat portion 108 formed on the lower side of end wall 40 which is provided with a port 110 connecting inlet chamber 12 with cavity 32. Mounted on the lower end of valve actuating stem 100 is a flanged anticipating valve member 112 which cooperates with port 110 upon movement of piston 44 to control communication between chamber 12 and cavity 32. The relative areas of port 110 and bleed port 38 in cavity 32 are such that when the valve 112 is open, the pressure in cavity 32 is essentially the same as the pressure in chamber 12. As a result the pressure drop across main valve 26 tending to close the valve is negligible when valve 112 is open so that the only force opposing opening movement of main valve 26 is that of a spring 120. Annular sealing members 114 are mounted on guide member 30 to prevent the escape of pressure between the opposed walls of main valve 26 and guide member 30.

Upward movement of piston 44 is transmitted to valve 26 by a snap ring 116 mounted in projection 104 which cooperates with the flange on valve member 112. Valve member 112 is biased away from port 110 by a spring 118 seated in the cavity defined by the hollow portion of projection 104 and valve seat portion 108.

Piston 44 is opposed on its lower side by the inlet pressure in chamber 12 and on its upper side by the pressure in pilot chamber 48 together with the force of a spring 120 which is seated against member 56 and the upper side of piston member 92. Inlet chamber 12 is in communication with pilot chamber 48 by means of a restricted orifice 122 which extends through piston 44. Thus, when pilot valve 74 is closed, the pressure in chamber 48 is the same as the pressure in inlet chamber 12 and the only force opposing movement of piston 44 is that provided by spring 120.

Secured to casing member 42 by bolts 123 is a cover member 124. Cover member 124 is formed with a downwardly projecting ridge 126 which cooperates with a shoulder formed on a flange 128 of casing member 42 to clamp the peripheral edges of a diaphragm 130 between the members. Diaphragm 130 forms a flexible wall for chamber 50 which engages the upper end of stem 72 to actuate pilot valve 74 in response to the pressure variations in chamber 50 and outlet chamber 14. Diaphragm 130 is preferably of metallic material.

Plate 124 is recessed at 132 for receiving the head of a plunger member 134 having a stem 136. Recess 132 is coaxial with an opening 138 having a shoulder 140. Shoulder 140 provides a seat for one end of a spring 142, the other end of which is seated against plunger 134 to bias the plunger against diaphragm 130.

Mounted on plate member 124 is a range spring housing 144 (FIG. 1) which is coaxial with opening 138 and is secured to plate member 124 by welding or other conventional means. Spring housing 144 is provided with a threaded opening in its upper wall for receiving a range adjustment screw 146. Stem 136 is formed with an enlarged, flanged portion 148 which extends into spring housing 144. Plunger 136 is biased in a direction to open pilot valve 74 by a range spring 150 which is mounted between the flanged portion 148 and a spring seat member 152 seated against the end of adjustment screw 146. Screw 146 is retained in a desired setting by a lock nut 154 cooperating with the upper side of housing 144. A cap 156 is screwed onto housing 144 to protect adjustment screw 146 against accidental rotation.

Extending laterally from plate 124 (FIG. 1) is a support arm 158. Secured to arm 158 by screw 160 is a U-shaped frame 162 having vertical parallel legs 164 and 166 for supporting a thermostat assembly 168.

Thermostat 168 is of conventional construction, the specific details of which form no part of the present invention, and comprises an inverted cup-shaped housing 170 in which is mounted a bellows 172 having a movable end wall 174. Bellows 172 forms an expansible chamber 176 with the interior of housing 170. Chamber 176 communicates with a temperature sensing bulb 178 through a capillary tube 180. Chamber 176, bulb 178 and capillary tube 180 form a closed system which is filled with a fluid that expands and contracts with temperature variations. Bulb 178 may, for example, be completely filled with a liquid that undergoes volumetric changes with temperature variations, or the bulb may contain a liquid that boils at relatively low temperatures and gives off vapor when the bulb is heated, thereby creating pressure in chamber 176 proportional to the temperature to which bulb 178 is exposed.

Expansion and contraction of chamber 176 causes vertical reciprocatory movement of an actuating stem 188 which is pivotally connected at one end to a lever arm 190. Expansion of chamber 176 is opposed by a spring 192 which has one end seated against a member 182 which is rotatably adjustable to increase and decrease the compression of spring 192 to determine the temperature at which chamber 176 will expand against the force of the spring.

Lever arm 190 is fulcrumed intermediate its ends on a substantially knifed-edged pivot 194 mounted on plate member 124 so that vertical movement of stem 188 causes lever 190 to rotate about pivot 194. Lever arm 190 has a bifurcated end portion 196 which receives the enlarged portion of plunger 134 and engages the lower side of flange 148. Therefore, downward movement of stem 188 upon expansion of chamber 176 causes stem 136 to move upwardly against the bias of spring 150. Thus, increases in temperature at bulb 178 causes a corresponding decrease in the biasing force tending to open pilot valve 74 and the flow through port 22 is reduced as the temperature at bulb 178 increases.

With the parts in the positions illustrated in FIG. 2, main valve 26, anticipating valve 112 and pilot valve 74 are closed. The pressures in pilot chamber 48 and inlet chamber 12 are the same due to orifice 122 and the only force acting on piston 44 is that of spring 120 since the pressures are balanced on opposite sides of the piston. Main valve 26 is thus maintained in the closed position by the force of spring 120 and inlet pressure acting downwardly on wall 40. Because port 110 is closed by valve 112, the pressure in cavity 32 is the same as the outlet pressure in chamber 14.

Diaphram 130 is opposed on one side by springs 142 and 150 and on the other side by outlet pressure which is communicated to chamber 50 through conduit 52. Assuming that sensing bulb 178 is cooled so that the pressure in chamber 176 is insufficient to overcome spring 192 of the thermostat, spring 150 is opposed only by the pressure in chamber 50.

When the outlet pressure in chamber 14 falls below the value determined by spring 150, pilot valve 74 opens to connect pilot chamber 48 with chamber 50 resulting in a drop in pressure in pilot chamber 48. The resulting pressure differential across piston 44 causes the piston to move upwardly against spring 120 unseating valve 112 and opening port 110. When port 110 is opened, inlet pressure flows into cavity 32, and due to the relatively small size of bleed port 38, the pressure drop across end wall 40 of the main valve is negligible.

As piston 44 continues to move upwardly, the flange of valve element 112 engages snap ring 116 to move the main valve in an opening direction until the outlet pressure reaches the value determined by the force of spring 150 on diaphragm 130 at which point the pressure differential across piston 44 is balanced by spring 120. A further increase in load demand results in an additional decrease in the outlet pressure to further increase the pressure drop across piston 44, and main valve 26 is further opened to correct for the increase in load. When the outlet pressure is sufficient to cause pilot valve 74 to close, orifice 122 permits the pressure to equalize across piston 44, and spring 120 moves piston 44 downwardly to first close port 110 and then move main valve 26 downwardly to reduce the flow through port 22. As soon as port 110 is closed by anticipating valve 112, the pressure in cavity 32 begins to drop due to the escape of fluid through bleed port 38. Accordingly, the inlet pressure becomes greater than the pressure in cavity 32 resulting in a net downward force on end wall 40 which augments the force of spring 120.

When the temperature at bulb 178 is sufficient to overcome the force of spring 192, stem 188 is moved downwardly by the expansion of chamber 176 to rotate lever arm 190 and reduce the force on diaphragm 130. This causes a drop in the outlet pressure because the force acting on diaphragm 130 against the pressure in chamber 50 is reduced, permitting pilot valve 74 to close at a lower outlet pressure. Thus, increases and decreases in temperature at bulb 178 cause a corresponding increase and decrease in the force on diaphragm 130, and the thermostat in effect resets the outlet pressure. Accordingly, at any constant temperature on the bulb the outlet pressure remains substantially constant regardless of load changes downstream.

As a pressure regulator only, thermostat assembly 168 may be omitted and the position of main valve 26 will be determined by variations in the outlet pressure.

While a specific embodiment of the invention has been illustrated and described, the invention is not limited to the exact construction shown. Various alterations and modifications in the structure and arrangement of parts can be made without departing from the scope of the invention which is defined in the appended claims.

What is claimed is:
1. A regulator comprising,
a body having an inlet chamber and an outlet chamber,
a guide member mounted in said body,
an open ended cavity in the guide member,
a restricted passage connecting the cavity with the outlet chamber,
a main valve slidable on the guide member for controlling flow from the inlet to the outlet chamber, and having an end wall overlying the open end of the cavity,
a port in said end wall providing communication between the inlet chamber and the cavity,
a piston movable in response to pressure variations in the outlet chamber,
and an anticipating valve carried by the piston movable in one direction to close the port and actuate the main valve in a direction to decrease the flow from the inlet chamber to the outlet chamber, and movable in the opposite direction to open the port and actuate the valve in a direction to increase the flow from the inlet to the outlet chamber.

2. A regulator comprising,
a body having an inlet chamber and an outlet chamber with a port therebetween,
a cylindrical valve seat member mounted in the port with one end projecting toward the inlet chamber,
a plurality of upwardly diverging grooves formed in said one end of the valve seat member,
a cylindrical guide member in the inlet chamber,
a cavity formed in the guide member having an open end,
a restricted passage connecting said cavity with the outlet chamber,
a cylindrical main valve slidably mounted on the guide member and telescopically movable relative to the valve seat member to control the rate of flow through the port,
said main valve having a wall cooperating with the open end of said cavity to separate the cavity from the inlet chamber,
a port in said wall,
mean movable in response to pressure variations in the outlet chamber,
and an anticipating valve carried by said movable means operable upon movement of said movable means in one direction to sequentially close the port in the end wall of the main valve and actuate the main valve in a direction to decrease the flow between the inlet and outlet chamber, and operable upon movement of said movable means in the opposite direction to sequentially open the port in the end wall of the main valve to establish communication between the inlet chamber and said cavity and actuate the main valve in a direction to increase the flow between the inlet and outlet chambers.

3. A regulator comprising,
a body having an inlet chamber and an outlet chamber with a port therebetween,
a cylindrical valve seat member mounted in the port and projecting into the inlet chamber,
a plurality of grooves in the inlet end of said cylindrical valve seat member,
a tubular stem projecting through the port and supported on the valve seat member with one end communicating with the outlet chamber,
a cylindrical guide member in the inlet chamber supported on the other end of said tubular stem, the outer diameter of the guide member corresponding to the outer diameter of the cylindrical valve seat member,
a cavity formed in the guide member having an open end opposite the tubular stem,
a restricted bleed port connecting the cavity with the passage defined by said tubular stem,
a cylindrical main valve mounted on the guide member and having an inner diameter corresponding substantially with the outer diameters of the guide member and valve seat member such that the main valve is telescopically movable relative to the guide member and valve seat member to control the rate of flow from the inlet chamber to the outlet chamber,
an end wall formed on the main valve overlying the open end of the guide member,
means providing a fluid tight seal between the inner wall of the main valve and the outer wall of the guide member,
a port in the end wall of said main valve for connecting the inlet chamber with said cavity,
a pilot chamber having a smooth cylindrical wall,
a pilot valve movable in response to pressure variations in the outlet chamber controlling communication between the pilot chamber and the outlet chamber,
a piston slidably mounted in said pilot chamber and subject on one side to pilot chamber pressure and on the other side to inlet chamber pressure,
means providing a fluid tight seal between the outer periphery of the piston and the pilot chamber wall,
a restricted orifice in the piston providing communication between the inlet chamber and the pilot chamber,
an anticipating valve carried by the piston for controlling the port in said end wall of the main valve and movable by said piston in response to increases in pressure in the pilot chamber in one direction to sequentially close said port in the end wall of the main valve and actuate the main valve in a direction to decrease the flow between through the main port from the inlet to the outlet chambers,
a spring biasing said piston in said one direction,
an abutment formed on said end wall of the main valve,
said anticipating valve being operable to sequentially open the port in the end wall of the main valve and engage said abutment to move the main valve in a direction to increase the flow between the inlet and outlet chambers in response to decreases in pressure in the pilot chamber.

4. A regulator as defined in claim 3 further including a flexible diaphragm movable in response to variations in the outlet pressure for actuating said pilot valve,
and resilient means biasing the diaphragm in a direction to open the pilot valve.

5. A regulator as defined in claim 4 including,
thermostatic means having an actuating stem movable in response to temperature variations,
and a lever fulcrumed intermediate its ends pivotally connected at one end with the actuating stem,
the other end of the lever being engageable with the resilient means to recrease the biasing force on the diaphragm in response to increases in temperature.

6. A pressure regulator comprising,
a body member with an inlet chamber and an outlet chamber formed therein,
a port connecting the inlet and outlet chambers,
a cylindrical valve seat member in the port with a plurality of substantially V-shaped grooves formed in the walls thereof,
a cylindrical guide member in the inlet chamber supported in axially spaced relationship with the port,
an open ended cavity formed in the guide member,
a restricted bleed port connecting said cavity with the outlet chamber,
a cylindrical main valve slidably mounted on the guide member for movement telescopically relative to the guide member and valve seat member to control the rate of flow through the port,
said main valve having an end wall overlying the open end of said cavity with a port in said end wall providing communication between the inlet chamber and the cavity,
a casing member mounted on the body member,
a cylindrical pilot chamber formed in said casing member coaxially disposed relative to the port,
a piston in the pilot chamber subject on one side to inlet chamber pressure and on the other side to pilot chamber pressure and reciprocably movable in the pilot chamber in response to pressure differentials acting on the piston,
a restricted orifice in the piston connecting the inlet and pilot chambers,
and an anticipating valve carried by the piston and movable by the piston in one direction to sequentially close the port in the end wall of the main valve and move the main valve in a direction to decrease the flow between the inlet and outlet chambers and movable by the piston in the opposite direction to sequentially open the port in the end wall of the main valve and move the main valve in a direction to increase the flow between the inlet and outlet chambers.

7. A regulator as defined in claim 6 including,
a wall formed in the casing member defining one end of said pilot chamber,
a recess formed in the casing member in the opposite side of said wall from the pilot chamber,
a pilot valve seat member mounted in said recess,
a flexible diaphragm mounted across the end of said recess to define, with said wall, an expansible chamber,
a passage in said pilot valve seat member connecting said expansible chamber with the pilot chamber,
a pilot valve resiliently mounted in said pilot valve seat member and movable between open and closed position to control communication between said expansible chamber and the pilot chamber,
said pilot valve having a stem engageable by said diaphragm for actuating said pilot valve in response to movement of said flexible diaphragm,
and a conduit connecting said expansible chamber with the outlet chamber.

8. A regulator as defined in claim 7 further including,
means adjustably biasing the flexible diaphragm in a direction to open the pilot valve, with increases in pressure in said expansible chamber acting in opposition to said biasing means,
and thermostatic means including a remotely positioned sensing element connected with said biasing means to vary the biasing force on said flexible diaphragm in response to temperature changes.

References Cited in the file of this patent
UNITED STATES PATENTS

| | | |
|---|---|---|
| 1,422,343 | Davies | July 11, 1922 |
| 1,979,779 | Tobin | Nov. 6, 1934 |
| 2,040,109 | Spance | May 12, 1936 |
| 2,087,037 | McCarthy | July 13, 1937 |
| 2,401,144 | Dube | May 28, 1946 |
| 2,635,636 | Carson | Apr. 21, 1953 |
| 2,805,039 | Angelery | Sept. 3, 1957 |